US009375793B2

(12) United States Patent
Brunetto et al.

(10) Patent No.: US 9,375,793 B2
(45) Date of Patent: Jun. 28, 2016

(54) CUTTING INSERT FOR HEAVY MACHINING OPERATIONS

(71) Applicants: Lance David Brunetto, Greensburg, PA (US); Jeffrey Francis Kovac, Loyalhanna, PA (US)

(72) Inventors: Lance David Brunetto, Greensburg, PA (US); Jeffrey Francis Kovac, Loyalhanna, PA (US)

(73) Assignee: KENNAMETAL INC., Latrobe, PA (US)

( * ) Notice: Subject to any disclaimer, the term of this patent is extended or adjusted under 35 U.S.C. 154(b) by 290 days.

(21) Appl. No.: 14/065,859

(22) Filed: Oct. 29, 2013

(65) Prior Publication Data
US 2015/0117968 A1   Apr. 30, 2015

(51) Int. Cl.
B23C 5/06   (2006.01)
B23C 5/24   (2006.01)
B23C 5/20   (2006.01)

(52) U.S. Cl.
CPC ............. B23C 5/2475 (2013.01); B23C 5/06 (2013.01); B23C 5/207 (2013.01); *B23C 2200/0494* (2013.01); *B23C 2200/085* (2013.01); *B23C 2200/12* (2013.01); *B23C 2200/164* (2013.01); *B23C 2200/203* (2013.01); *B23C 2200/286* (2013.01); *B23C 2200/367* (2013.01); *B23C 2210/166* (2013.01); *Y10T 407/1924* (2015.01); *Y10T 407/23* (2015.01)

(58) Field of Classification Search
CPC ............ B23C 5/207; B23C 2200/0494; B23C 2200/085; B23C 2200/12; B23C 2200/203; B23C 2210/166; B23C 2200/367; Y10T 407/1924; Y10T 407/23
USPC .................................................... 407/42, 113
See application file for complete search history.

(56) References Cited

U.S. PATENT DOCUMENTS

| 3,694,876 | A | 10/1972 | Erkfritz |
| 4,202,650 | A | 5/1980 | Erickson |
| 4,575,287 | A | 3/1986 | Oshnock et al. |
| 5,292,213 | A | 3/1994 | Massa et al. |
| 5,810,518 | A | 9/1998 | Wiman et al. |
| 5,888,029 | A | 3/1999 | Boianjiu |
| 6,872,034 | B2 | 3/2005 | Satran et al. |

(Continued)

FOREIGN PATENT DOCUMENTS

| JP | H06-63812 A | 3/1994 |
| WO | 96-32217 A1 | 10/1996 |

(Continued)

*Primary Examiner* — Sunil K Singh
*Assistant Examiner* — Alan Snyder
(74) *Attorney, Agent, or Firm* — Larry R. Meenan

(57) ABSTRACT

A cutting insert for heavy machining operations is described. The cutting insert has two opposing end surfaces, two identical opposing major side surfaces and two identical opposing minor side surfaces. The cutting insert further includes a major cutting edge formed at an intersection of each major edge and the end surface, and a minor cutting edge formed at an intersection of each minor edge and the end surface, and a corner cutting edge formed at an intersection of the major and minor cutting edges. The major cutting edge has a non-linear, variable slope with respect to a central axis A2 passing through the two minor side surfaces of the cutting insert.

12 Claims, 6 Drawing Sheets

(56) References Cited

U.S. PATENT DOCUMENTS

| | | |
|---|---|---|
| 7,014,396 B2 | 3/2006 | Satran et al. |
| 7,063,489 B2 | 6/2006 | Satran |
| 7,073,987 B2 | 7/2006 | Hecht |
| 7,104,736 B2 | 9/2006 | Satran et al. |
| 7,381,015 B2 | 6/2008 | Jonsson |
| 8,029,213 B2 * | 10/2011 | Tanaka ............... B23C 5/207 407/113 |
| 8,277,153 B2 | 10/2012 | Kovac et al. |
| 2003/0170080 A1 | 9/2003 | Hecht |
| 2006/0210365 A1 | 9/2006 | Hecht |
| 2012/0121345 A1 | 5/2012 | Neiman et al. |
| 2013/0336735 A1 * | 12/2013 | Nam ..................... B23C 5/06 407/113 |

FOREIGN PATENT DOCUMENTS

| | | |
|---|---|---|
| WO | 02-24387 A1 | 3/2002 |
| WO | 03-074218 A1 | 9/2003 |
| WO | 2004-050283 A1 | 6/2004 |
| WO | 2011-068691 A2 | 6/2011 |

* cited by examiner

CUTTING INSERT FOR HEAVY MACHINING OPERATIONS

FIELD OF THE INVENTION

In general, the invention relates to a cutting insert and a cutting tool, and in particular to a cutting insert for a milling cutter that contact with each other in an area where high cutting forces occur so as to help distribute the loads (stresses) encountered in the cutting operation, as well as provide protection of the insert pocket in case of insert failure.

BACKGROUND OF THE INVENTION

One problem encountered with conventional tool holders is that of holding the cutting insert securely in the pocket of the tool holder. At the beginning of a cutting operation, the sudden transition from no load to extreme pressure load on the insert can cause the insert to shift position in the holder and thereby affect the accuracy of the planned cut. At the end of the cutting operation, the sudden disengagement of the cutting insert from the workpiece causes the pressure load suddenly to be removed from the insert. This sudden change in load can cause the insert to shift and distress any repeatable dimensional accuracy, which is essential for most tool holders, especially cutting inserts used in Numerically Controlled machines, to meet.

During the cutting operation, loads of up to 35,000 pounds may be encountered on the cutting insert which, if the insert is not precisely located and firmly held in the holder to begin with, can also cause shifting of the insert during the cutting operation. It is, therefore, important to provide a tool holder that can precisely and securely seat a cutting insert and then securely hold the cutting insert in location during all phases of the heavy duty cutting operation.

SUMMARY OF THE INVENTION

In one aspect of the invention, a cutting insert comprises two opposing end surfaces, two opposing minor side surfaces extending between the two opposing end surfaces, and two opposing major side surfaces extending between the end surfaces and the minor side surfaces. Each end surface has four corners including two lowered corners and two raised corners. Each end surface is provided with two raised members and two lowered abutment members. Each lowered abutment member has a shim abutment surface. The cutting insert further includes two opposing major edges formed at an intersection of each end surface and the major side surfaces, two opposing minor edges formed at an intersection of each end surface and the minor side surfaces, and two opposing corner edges formed at an intersection of each the corner side surfaces and the major side surfaces. The cutting insert further includes a major cutting edge formed at an intersection of each major edge and the end surface, and a minor cutting edge formed at an intersection of each minor edge and the end surface, and a corner cutting edge formed at an intersection of the major and minor cutting edges. The major cutting edge has a non-linear, variable slope with respect to a central axis A2 passing through the two minor side surfaces of the cutting insert.

In another aspect, a milling cutter comprises a plurality of insert pockets, wherein the cutting insert of the invention and a shim are seated in each of the plurality of insert pockets.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Figure 1:
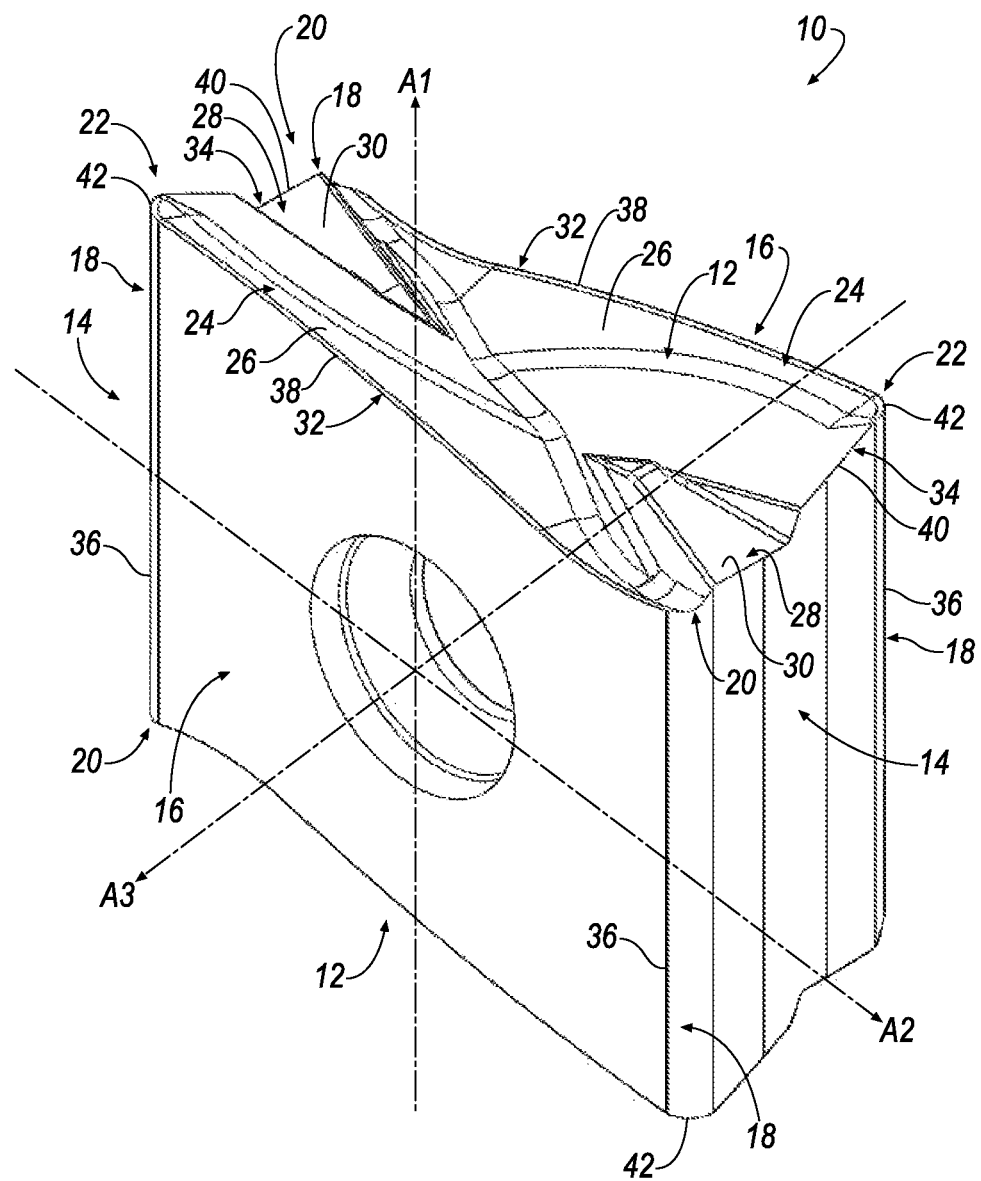
FIG. 1 is an isometric view of an exemplary embodiment of a cutting insert of the invention.

Referring now to FIGS. 1-5, a cutting insert 10 is shown according to an embodiment of the invention. In general, the cutting insert 10 is tangential and indexable. The cutting insert 10 is typically manufactured by form-pressing and sintering carbide powders using methods well-known in the art. The cutting insert 10 is generally rectangular in shape and has two identical opposing end surfaces 12, two identical opposing minor side surfaces 14 extending between the two opposing end surfaces 12, two identical opposing major side surfaces 16 extending between the end surfaces 12 and the minor side surfaces 14. Each end surface 12 has 180° rotational symmetry about a first central axis A1 passing through the two end surfaces 12, each minor side surface 14 has 180° rotational symmetry about a second central axis A2 passing through the two minor side surfaces 14, and each major side surface 16 has 180° rotational symmetry about a third central axis A3 passing through the two major side surfaces 16. The second central axis A2 is perpendicular to the first central axis A1, and the third central axis A3 is perpendicular to the first central axis A1 and to the second central axis A2. The cutting insert 10 also includes four opposed corner side surfaces 18 between the minor and major side surfaces 14, 16 and the end surfaces 12.

Figure 2:
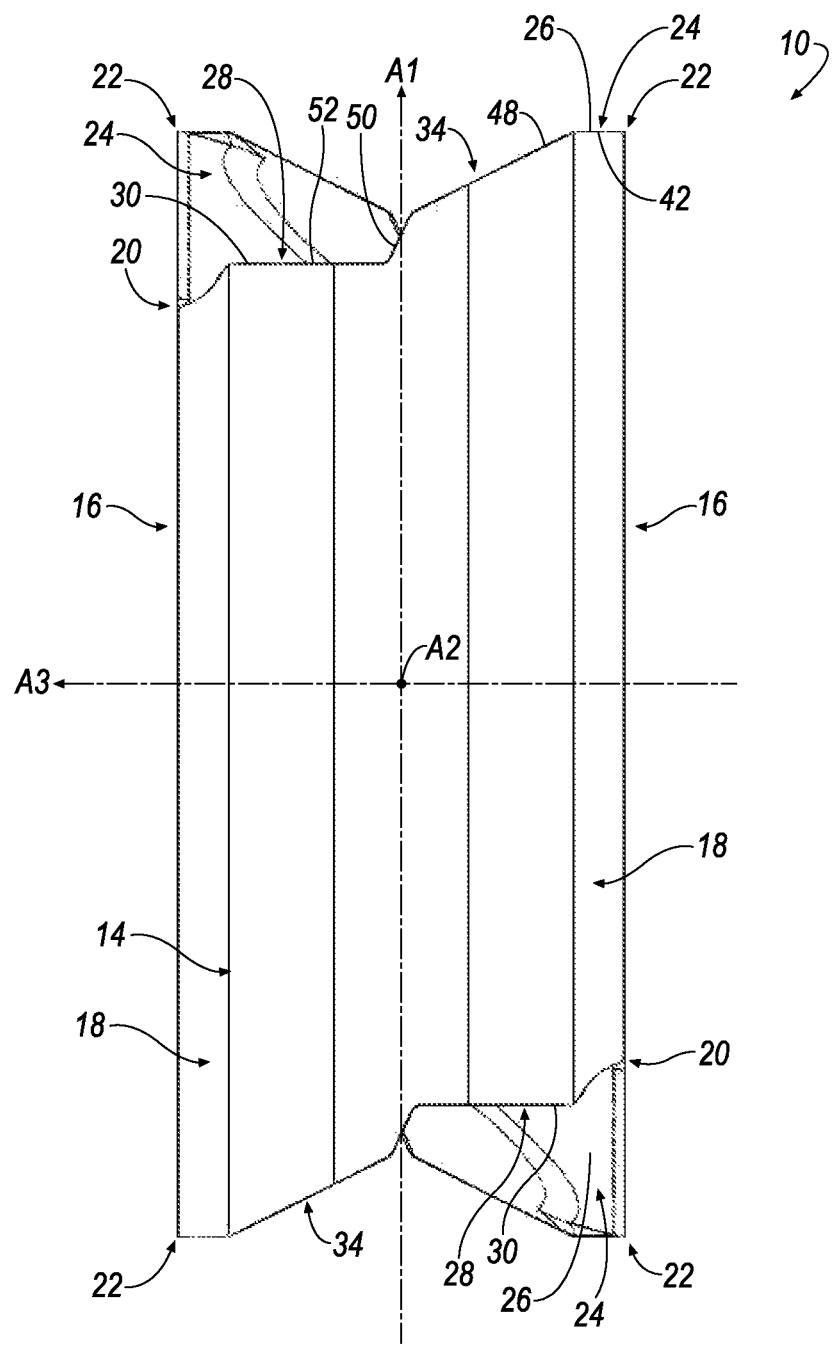
FIG. 2 is an end view of the exemplary embodiment of the cutting insert of FIG. 1.
Figure 3:
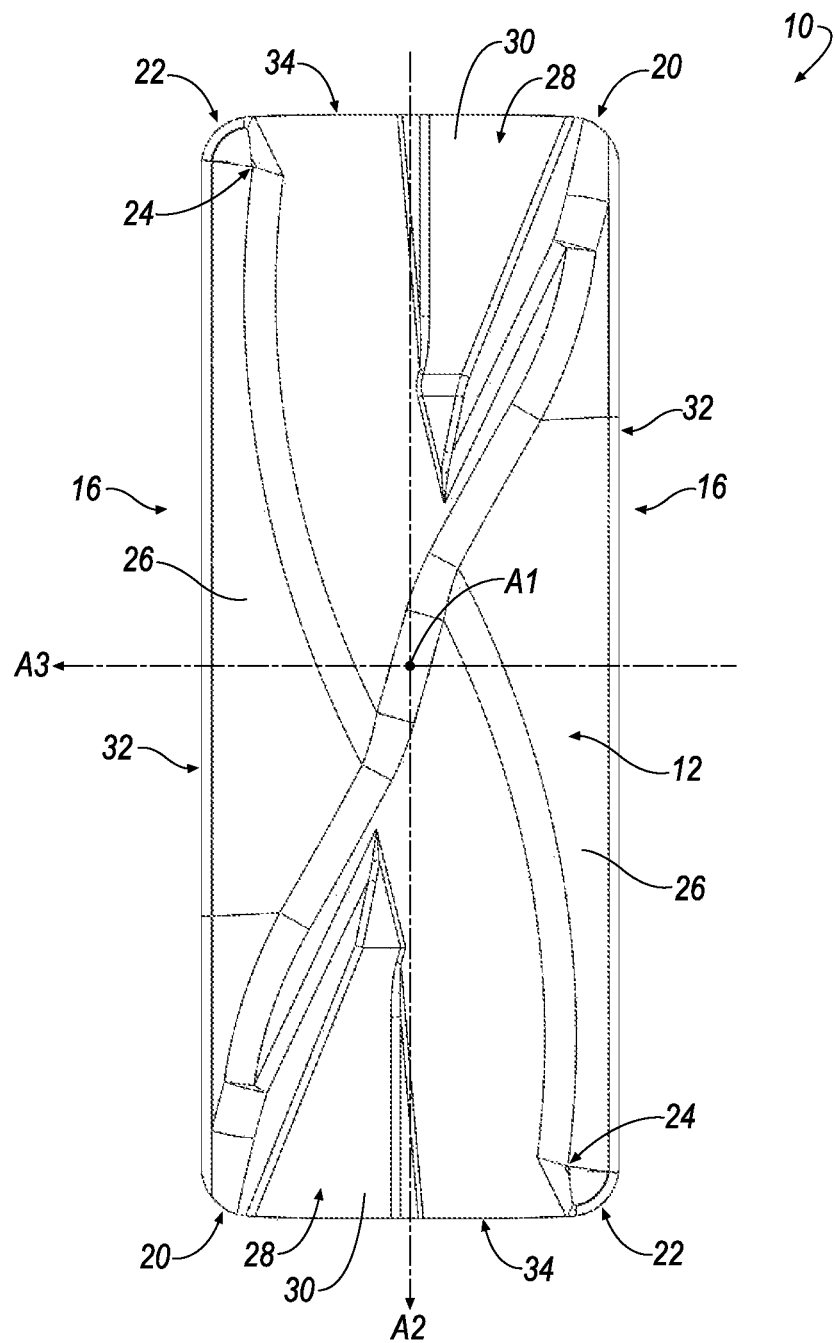
FIG. 3 is a top view of the exemplary embodiment of the cutting insert of FIG. 1.
Figure 6:
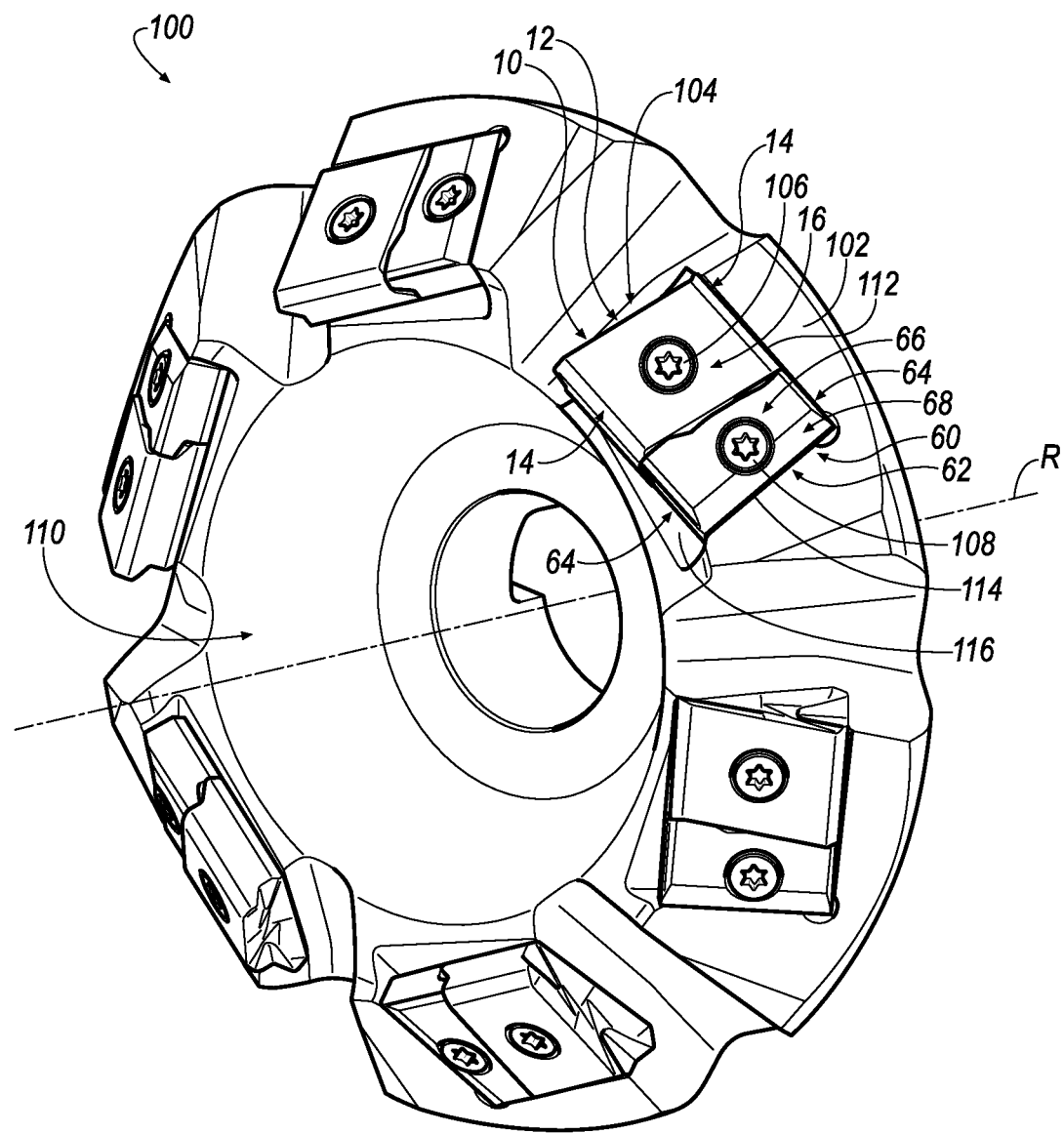
FIG. 6 is an isometric view of an exemplary embodiment of a milling cutter with the exemplary embodiment of the cutting insert of FIG. 1 and a shim seated in insert pockets of the milling cutter.

Each end surface 12 has four corners; two diagonally opposite lowered corners 20 and two diagonally opposite raised corners 22. The lowered corners 20 are closer to the second central axis A2 than the raised corners 22. Each corner side surface 18 extends between the raised corner 22 of one of the two opposing end surfaces 12 and the lowered corner 20 of the other one of the two opposing end surfaces 12. Each end surface 12 is provided with two raised members 24, each raised member 24 having a surface 26, and two lowered abutment members 28, each lowered abutment member 28 having a shim abutment surface 30 for contacting a shim 60 (FIG. 6). The shim abutment surfaces 30 are diagonally opposite each other with respect to the second central axis A2. As seen in FIGS. 2 and 3, the shim abutment surfaces 30 are substantially coplanar with each other and are substantially parallel with both the second central axis A2 and the third central axis A3.

Figure 4:
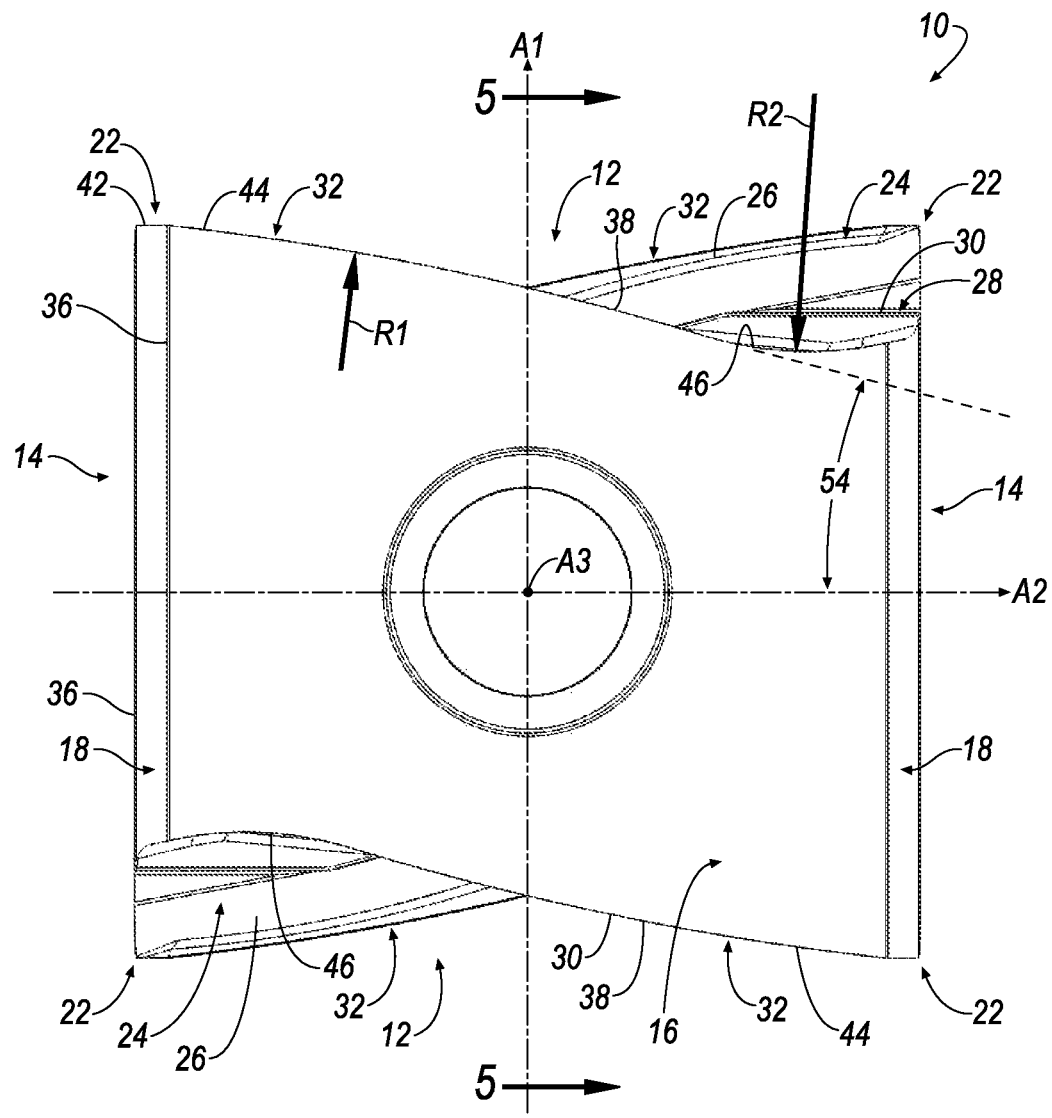
FIG. 4 is a front view of the exemplary embodiment of the cutting insert of FIG. 1.
Figure 5:
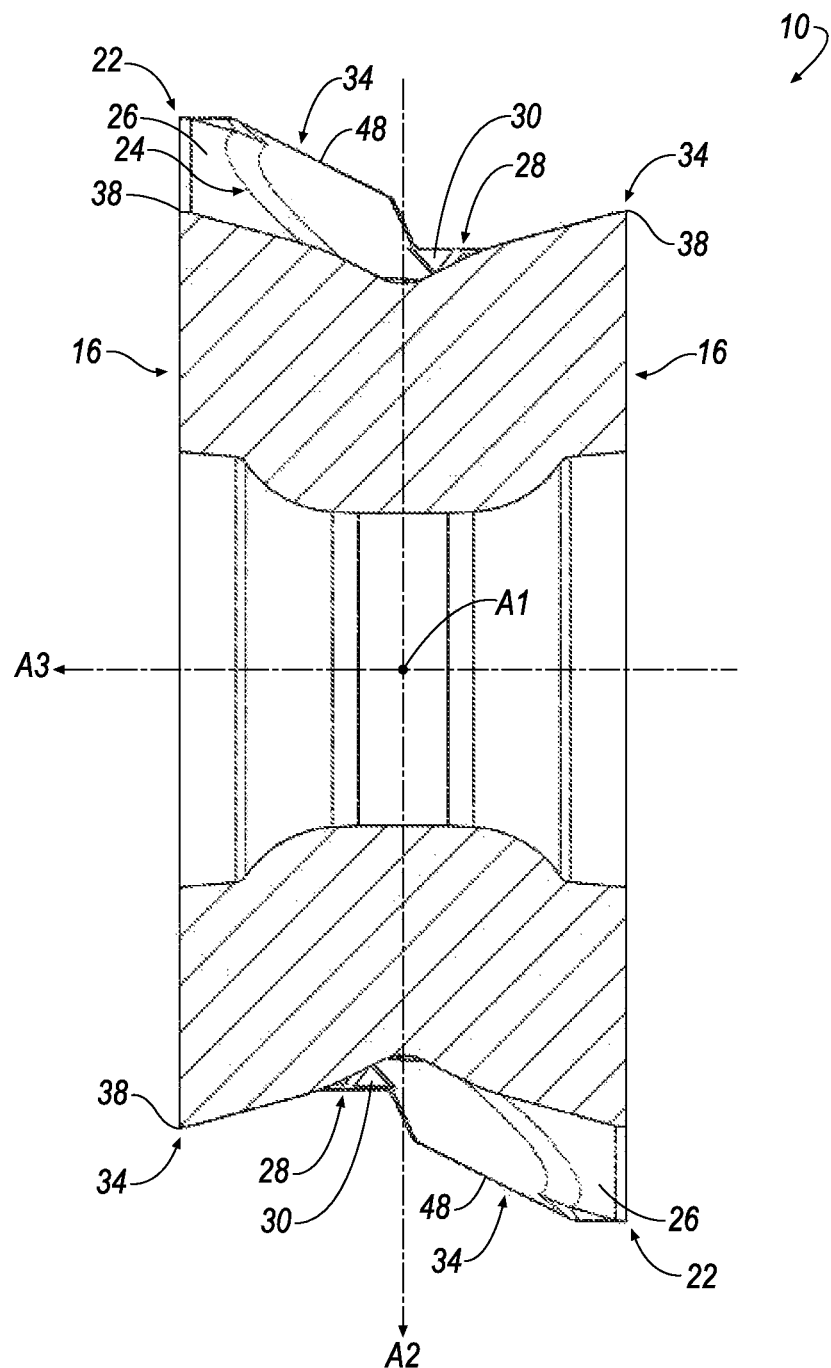
FIG. 5 is a cross-sectional view of the exemplary embodiment of the cutting insert taken along line 5-5 of FIG. 4.

Two opposing major edges 32 are formed at the intersection of each end surface 12 and the major side surfaces 16, two opposing minor edges 34 are formed at the intersection of each end surface 12 and the minor side surfaces 14, and two opposing corner edges 36 are formed at the intersection of each the corner side surfaces 18 and the major side surfaces 16. A major cutting edge 38 is formed at the intersection of each major edge 32 and the end surface 12 and extends along substantially the entire length of its associated major edge 32. A minor cutting edge 40 is formed at the intersection of each minor edge 34 and the end surface 14 and extends less than half of the length of its associated minor edge 34. A corner cutting edge 42 is formed at the intersection of the major and minor cutting edges 38, 40. The section of the major cutting edge 38 proximate the raised corner 22 constitutes a leading end 44 of the major cutting edge 38, whereas the section of the major cutting edge 38 proximate the lowered corner 20 constitutes a trailing end 46 of the major cutting edge 38, as shown in FIG. 4. Because the cutting insert 10 is symmetric about all three axes, A1, A2 and A3, the cutting insert 10 has a total of four major cutting edges 38, four minor cutting edges 40 and four corner cutting edges 42.

As seen in FIG. 2, the minor edge 34 is divided into three substantially straight sections; a first section 48 extending from the raised corner 22 to proximate the central axis A1; a second section 50 extending from the first section 48 to approximately the central axis A1; and a third section 52 extending from the central axis A1 to proximate the lowered corner 20. As seen in FIG. 2, the minor edge 34 is generally L-shaped when viewed from the side of the cutting insert 10. That is, the first section and second sections 48, 50 are angled with respect to the third central axis A3, and the third section 52 is substantially parallel to the third central axis A3. In other words, the first, second and third sections 48, 50, 52 do not overlap and do not lie on a common straight line when viewed from the side of the cutting insert 10.

One aspect of the invention is that the major cutting edge 38 has a non-linear, variable slope with respect to the second central axis A2, as shown in FIG. 4. In the illustrated embodiment, the major cutting edge 38 proximate the leading end 44 has a slightly convex profile with a radius R1 and the major cutting edge 38 proximate the trailing end 46 has a concave profile with a radius R2 that is smaller than the radius R1, unlike conventional cutting inserts with linear cutting major edges. More specifically, the major cutting edge 38 proximate the leading end 44 defines a different angle 54 with respect to the second central axis A2 that varies between +5 degrees to about +45 degrees than the major cutting edge 38 proximate the trailing end 46 that varies between −5 degrees to about +30 degrees. In other words, the slope of the major cutting edge 38 with respect to the second central axis A2 increases from the leading end 44 to the trailing end 46. The varying slope and profile of the major cutting edge 38 provide stable and free cutting action.

Referring now to FIG. 6, a milling cutter 100 is shown according to an embodiment of the invention. The milling cutter 100 has an axis of rotation R, and a cutter body 102 with a plurality of insert pockets 104. In each insert pocket 104, the cutting insert 10 of the invention and a shim 60 are tangentially mounted to the cutter body 102 by means of a clamping screw 106, 108, respectively. In general, the shim 60 is generally rectangular in shape and has two opposing end surfaces 62, two opposing minor side surfaces 64 extending between the two opposing end surfaces 62, two opposing major side surfaces 66 extending between the end surfaces 62 and the minor side surfaces 64. As can be seen, each cutting insert 10 is seated so that there is a clearance between a workpiece (not shown) and the minor side surface 14 of the cutting insert 10, the minor side surface 64 of the shim 60 and the face 110 of the milling cutter 100.

The insert pocket 104 includes a side wall 112 and a rear wall 114 generally transverse to a bottom wall 116. Each wall 112, 114, 116 is generally planar. When seated in the insert pocket 104, one of the minor side surfaces 14 of the cutting insert 10 is adjacent and engages the side wall 112, and one of the major side surfaces 16 of the cutting inset 10 is adjacent and engages the bottom wall 116 of the insert pocket 104. Similarly, one of the minor side surfaces 64 of the shim 60 is adjacent and engages the side wall 112, and a major side surface 66 of the shim 60 is adjacent and engages the bottom wall 116 of the insert pocket 104.

In addition, the two diagonally opposite shim abutment surfaces 26 on the end surface 12 of the cutting insert 10 engages two diagonally opposite insert abutment surfaces (not shown) of the shim 60 in such a way so as to provide two-point contact between the cutting insert 10 and the shim 60. In addition, the cutting insert 10 and the shim 60 contact each other in an area where high cutting forces occur during heavy machining applications, thereby providing additional support to permit proper seating and reduced rotation of the cutting insert 10.

The patents and publications referred to herein are hereby incorporated by reference.

Having described presently preferred embodiments the invention may be otherwise embodied within the scope of the appended claims.

What is claimed is:

1. A cutting insert for heavy machining operations, comprising:
    two opposing end surfaces, two opposing minor side surfaces extending between the two opposing end surfaces, two opposing major side surfaces extending between the end surfaces and the minor side surfaces, four opposed corner side surfaces between the minor and major side surfaces and the end surfaces, each end surface having four corners comprising two lowered corners and two raised corners, each end surface provided with two raised members, each raised member provided with two lowered abutment members, each lowered abutment member having a shim abutment surface,
    wherein the cutting insert further includes two opposing major edges formed at an intersection of each end surface and the major side surfaces, two opposing minor edges formed at an intersection of each end surface and the minor side surfaces, and two opposing corner edges formed at an intersection of each the corner side surfaces and the major side surfaces, and
    wherein the cutting insert further includes a major cutting edge formed at an intersection of each major edge and the end surface, and a minor cutting edge formed at an intersection of each minor edge and the end surface, and a corner cutting edge formed at an intersection of the major and minor cutting edges, and
    wherein the minor cutting edge includes a first section extending from one of the two raised corners to proximate a first central axis A1 passing through the two end surfaces of the cutting insert, a second section extending from the first section to approximately the first central axis A1, and a third section extending from the first central axis A1 to proximate one of the two lowered corners, and
    wherein the first and second sections are angled with respect to a third central axis A3 passing through the two major side surfaces of the cutting insert, and the third section is substantially parallel to the third central axis A3.

2. The cutting insert of claim 1, wherein each end surface of the cutting insert has 180° rotational symmetry about the first central axis A1 passing through the two end surfaces of the cutting insert.

3. The cutting insert of claim 1, wherein each minor side surface has 180° rotational symmetry about a second central axis A2 passing through the two minor side surfaces.

4. The cutting insert of claim 1, wherein each major side surface has 180° rotational symmetry about the third central axis A3 passing through the two major side surfaces of the cutting insert, and wherein a second central axis A2 passing through the two minor side surfaces is perpendicular to the first central axis A1 passing through the two end surfaces, and the third central axis A3 is perpendicular to the first central axis A1 and to the second central axis A2.

5. The cutting insert of claim 1, wherein the shim abutment surfaces are substantially coplanar with each other and substantially parallel with both a second central axis A2 passing through the two minor side surfaces and the third central axis A3 passing through the two major side surfaces of the cutting insert.

6. The cutting insert of claim 1, wherein a section of the major cutting edge proximate the raised corner constitutes a leading end of the major cutting edge, and wherein a section of the major cutting edge proximate the lowered corner constitutes a trailing end of the major cutting edge.

7. The cutting insert of claim 6, wherein the slope of the major cutting edge increases from the leading end to the trailing end.

8. The cutting insert of claim 1, wherein the shim abutment surfaces are diagonally opposite each other with respect to a second central axis A2 passing through the two minor side surfaces of the cutting insert.

9. A milling cutter, comprising:
a plurality of insert pockets; and
a cutting insert in accordance with claim 1 seated in each of the plurality of insert pockets.

10. The milling cutter of claim 9, further comprising a shim seated in each of the plurality of insert pockets in such a way so as to provide two-point contact between the cutting insert and the shim.

11. The milling cutter of claim 9, wherein the shim further comprises two opposing end surfaces, two opposing minor side surfaces extending between the two opposing end surfaces, and two opposing major side surfaces extending between the end surfaces and the minor side surfaces.

12. The cutting insert of claim 1, wherein the major cutting edge has a non-linear, variable slope with respect to a second central axis A2 passing through the two minor side surfaces of the cutting insert.

* * * * *